(12) United States Patent
Kinugasa

(10) Patent No.: US 11,499,927 B2
(45) Date of Patent: Nov. 15, 2022

(54) ANALYSIS METHOD AND X-RAY FLUORESCENCE ANALYZER

(71) Applicant: JEOL Ltd., Tokyo (JP)

(72) Inventor: Genki Kinugasa, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/210,762

(22) Filed: Mar. 24, 2021

(65) Prior Publication Data

US 2021/0302336 A1 Sep. 30, 2021

(30) Foreign Application Priority Data

Mar. 27, 2020 (JP) .............................. JP2020-057573

(51) Int. Cl.
  *G01N 23/223* (2006.01)
  *G01T 1/24* (2006.01)

(52) U.S. Cl.
  CPC ............. *G01N 23/223* (2013.01); *G01T 1/24* (2013.01); *G01N 2223/076* (2013.01)

(58) Field of Classification Search
  CPC ........... G01N 23/223; G01N 2223/076; G01N 2223/61; G01T 1/24
  See application file for complete search history.

(56) References Cited

U.S. PATENT DOCUMENTS

| 5,457,725 | A | 10/1995 | Sato |
| 7,202,475 | B1 * | 4/2007 | Testoni ............ G01N 23/2252 |
| | | | 250/307 |

FOREIGN PATENT DOCUMENTS

| JP | 60250237 A | 12/1985 | |
| JP | 61132847 A | 6/1986 | |
| JP | 61210932 A | 9/1986 | |
| JP | 623650 A | 1/1987 | |
| JP | H06288941 A | 10/1994 | |
| JP | 2000131248 A | 5/2000 | |
| WO | WO-2021046059 A1 * | 3/2021 | ....... G01N 23/20016 |

OTHER PUBLICATIONS

Tsuji et al., Grazing-Exit X-Ray Spectrometry for Surface and Thin-Film Analyses, Jan. 2001, Japan society for Analytical Chemistry, vol. 17, pp. 145-148. (Year: 2001).*
Noma et al., Grazing Exit X-ray Fluorescence Spectroscopy for Thin-Film Analysis, Jul. 1, 1992, Jpn J. Appl. Phys.,vol. 31, pp. 900-903. (Year: 1992).*

(Continued)

*Primary Examiner* — Christine S. Kim
(74) *Attorney, Agent, or Firm* — The Webb Law Firm

(57) ABSTRACT

An analysis method using an X-ray fluorescence analyzer is provided in which an X-ray spectrum is acquired by detecting a secondary X-ray emitted from a specimen when the specimen is irradiated with a primary X-ray. The analysis method includes: acquiring a first X-ray spectrum obtained, with a take-off angle of the secondary X-ray being set as a first take-off angle; acquiring a second X-ray spectrum obtained, with a take-off angle of the secondary X-ray being set as a second take-off angle that is different from the first take-off angle; and obtaining information on an element in a depth direction of a specimen based on the first X-ray spectrum and the second X-ray spectrum.

8 Claims, 13 Drawing Sheets

(56) References Cited

OTHER PUBLICATIONS

Extended European Search Report issued in EP21161439.1 dated Aug. 9, 2021.
Ebel and Mayr, Praktische Anwendung der Rontgenfluoreszenzanalyse mit variabler Strahlengeometrie, Spectrochimica Acta, vol. 26B, 1971, pp. 291-299.
Tsuji and Hirokawa, Takeoff angle-dependent x-ray fluorescence of layered materials using a glancing incident x-ray beam, Journal of Applied Physics, vol. 75, No. 11, 1994, pp. 7189-7194.
Roberts et al., Nondestructive depth profile measurement of a Co/Ti bilayer using refracted x-ray fluorescence, Applied Physics Letters, vol. 66, No. 16, Apr. 17, 1995, pp. 2054-2056.
Office Action issued in JP2020057573 dated Feb. 15, 2022.

* cited by examiner

ANALYSIS METHOD AND X-RAY FLUORESCENCE ANALYZER

CROSS-REFERENCE TO RELATED APPLICATION

This application claims priority to Japanese Patent Application No. 2020-057573 filed Mar. 27, 2020, the disclosure of which is hereby incorporated by reference in its entirety.

BACKGROUND OF THE INVENTION

Field of the Invention

The present invention relates to an analysis method and an X-ray fluorescence analyzer.

Description of Related Art

An X-ray fluorescence analyzer can perform qualitative and quantitative analyses of a specimen by detecting, with a detector, a secondary X-ray which the specimen emits when irradiated with a primary X-ray from an X-ray tube. The X-ray fluorescence analyzer can measure a film thickness of the specimen (for example, see JP-A-2000-131248). Moreover, the X-ray fluorescence analyzer can measure a film thickness by using, for example, a thin-film fundamental parameter (FP) method, or a calibration curve method using a reference specimen.

However, for example, when a measurement target is the film thickness of a plated layer, conventional X-ray fluorescence analyzers are not able to determine whether a peak in the spectrum shows the peak of an element contained in the plated layer or the peak of an element contained in the matrix. Namely, when the specimen has a layer structure, conventional X-ray fluorescence analyzers cannot obtain information on elements, such as the order of layers and constituent elements of each layer, in the depth direction of the specimen.

SUMMARY OF THE INVENTION

According to a first aspect of the invention, there is provided an analysis method using an X-ray fluorescence analyzer which acquires an X-ray spectrum by detecting a secondary X-ray emitted from a specimen when the specimen is irradiated with a primary X-ray, the method including:

acquiring a first X-ray spectrum, with a take-off angle of the secondary X-ray being set as a first take-off angle;

acquiring a second X-ray spectrum, with a take-off angle of the secondary X-ray being set as a second take-off angle that is different from the first take-off angle; and obtaining information on an element in a depth direction of the specimen based on the first X-ray spectrum and the second X-ray spectrum.

According to a second aspect of the invention, there is provided an X-ray fluorescence analyzer including:

an X-ray tube that generates a primary X-ray;

a detector that detects a secondary X-ray emitted from a specimen when the specimen is irradiated with the primary X-ray; and a mechanism that makes a take-off angle of the secondary X-ray variable.

DESCRIPTION OF THE INVENTION

According to an embodiment of the invention, there is provided an analysis method using an X-ray fluorescence analyzer which acquires an X-ray spectrum by detecting a secondary X-ray emitted from a specimen when the specimen is irradiated with a primary X-ray, the method including:

acquiring a first X-ray spectrum, with a take-off angle of the secondary X-ray being set as a first take-off angle;

acquiring a second X-ray spectrum, with a take-off angle of the secondary X-ray being set as a second take-off angle that is different from the first take-off angle; and obtaining information on an element in a depth direction of the specimen based on the first X-ray spectrum and the second X-ray spectrum.

This analysis method utilizes the fact that a larger ratio of an amount of change in X-ray intensity to an amount of change in take-off angle of a secondary X-ray indicates the presence of an element at a deeper position to allow acquisition of information of an element in a depth direction of a specimen based on the first X-ray spectrum and the second X-ray spectrum. Thus, this analysis method enables acquisition of information of an element in a depth direction of a specimen with the use of an X-ray fluorescence analyzer.

According to an embodiment of the invention, there is provided an X-ray fluorescence analyzer including:

an X-ray tube that generates a primary X-ray;

a detector that detects a secondary X-ray emitted from a specimen when the specimen is irradiated with the primary X-ray; and a mechanism that makes a take-off angle of the secondary X-ray variable.

This X-ray fluorescence analyzer includes a mechanism that makes the take-off angle of a secondary X-ray variable, so that it is possible to obtain information of an element in a depth direction of a specimen, utilizing the fact that a larger ratio of an amount of change in X-ray intensity to an amount of change in take-off angle of a secondary X-ray indicates the presence of an element at a deeper position.

Preferred embodiments of the invention are described in detail below with reference to the drawings. It is noted that the following embodiments do not unduly limit the scope of the invention as stated in the claims. In addition, all of the elements described in the following embodiments are not necessarily essential requirements of the invention.

1. First Embodiment

1.1. X-Ray Fluorescence Analyzer

Figure 1:
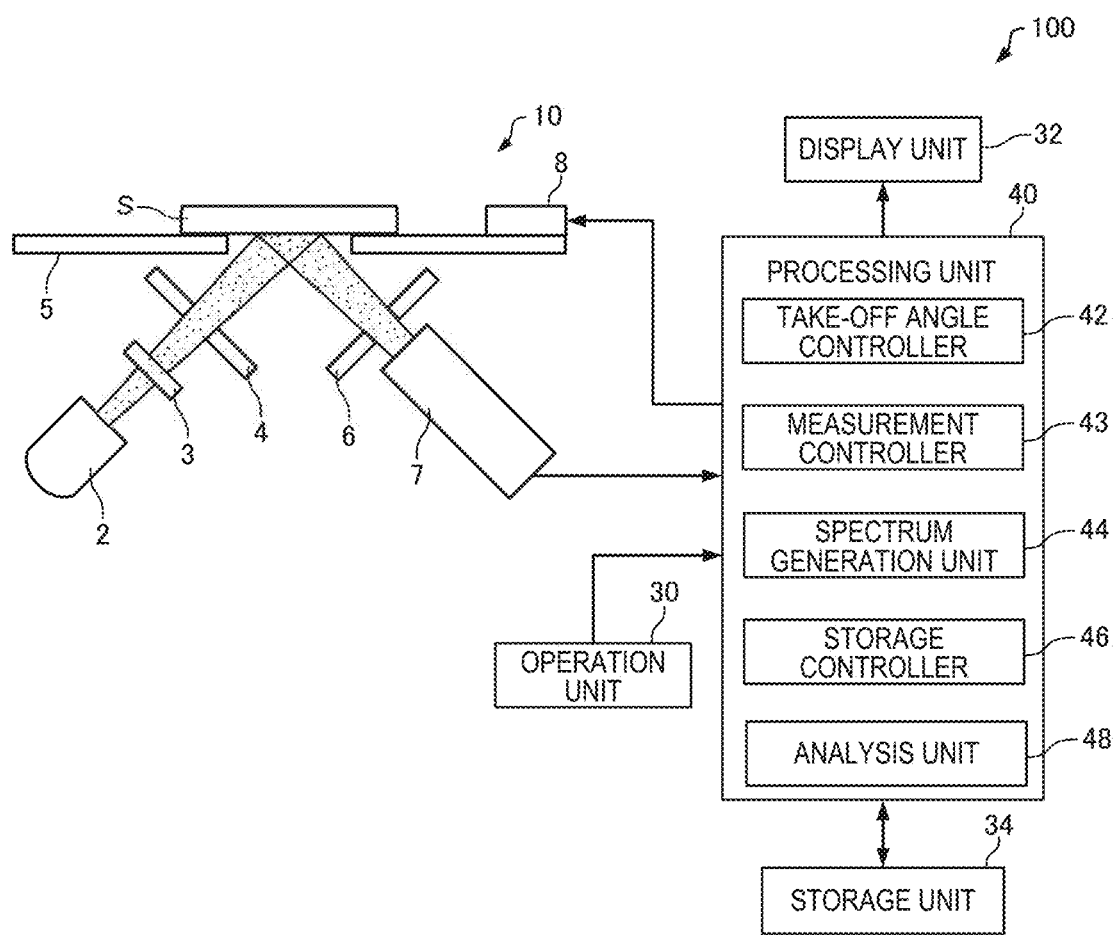
FIG. 1 is a diagram illustrating a configuration of an X-ray fluorescence analyzer according to the first embodiment.

First, an X-ray fluorescence analyzer according to a first embodiment is described with reference to the drawings. FIG. 1 is a diagram illustrating a configuration of the X-ray fluorescence analyzer 100 according to the first embodiment.

The X-ray fluorescence analyzer 100 is a device used for an X-ray fluorescence analysis. An X-ray fluorescence analysis is an analysis method where a specimen S is irradiated with a primary X-ray, and a secondary X-ray emitted from the specimen S as a result of the primary X-ray irradiation is detected and used for the analysis of the specimen S.

The X-ray fluorescence analyzer 100 includes an analyzer main body 10, an operation unit 30, a display unit 32, a storage unit 34, and a processing unit 40, as illustrated in FIG. 1.

The analyzer main body 10 includes an X-ray tube 2, a filter 3, a primary X-ray collimator 4, a specimen support plate 5, a secondary X-ray collimator 6, a detector 7, and a specimen tilting mechanism 8.

The X-ray tube 2 generates a primary X-ray. The tube voltage and tube current of the X-ray tube 2 are set in accordance with the material or analysis target element of the specimen S. The tube voltage is a voltage applied to the X-ray tube 2. The tube current is a current made to flow in the X-ray tube 2.

The filter 3 lets the X-ray generated in the X-ray tube 2 pass through. By irradiating the specimen S with the X-ray through the filter 3, some of the continuous X-rays and characteristic X-rays can be absorbed and removed by the filter, which can improve the P/B (peak-to-background) ratio, for example. The X-ray fluorescence analyzer 100 includes a plurality of filters 3 that have different energy bands they are able to reduce. The filter 3 to be used for the measurement is selected from the plurality of filters 3 in accordance with the measurement target element.

The primary X-ray collimator 4 limits the irradiation range of X-rays that irradiate the specimen S. The primary X-ray collimator 4 allows for selection of sizes of the irradiation range.

The specimen support plate 5 supports the specimen S. The specimen support plate 5 is formed with an opening, through which the primary X-ray irradiates the specimen S. The specimen S is accommodated in a specimen chamber of the analyzer main body 10. Although not shown, the X-ray fluorescence analyzer 100 is equipped with a vacuum evacuator to evacuate the specimen chamber to a vacuum level.

The secondary X-ray collimator 6 limits the acquisition range of secondary X-rays emitted from the specimen S. The secondary X-ray collimator 6 allows for efficient detection of a target secondary X-ray. A secondary X-ray here refers to an X-ray emitted from the specimen S when the specimen S is irradiated with a primary X-ray. The secondary X-ray includes fluorescent X-ray and scattered X-ray. Scattered X-ray is an X-ray emitted from a specimen when it is irradiated with a primary X-ray, by the scattering of atoms and electrons. Fluorescent X-ray is an X-ray emitted from a specimen when it is irradiated with a primary X-ray and outer electrons of atoms fill the holes left by the excited inner electrons.

The detector 7 detects a secondary X-ray emitted from the specimen S. The detector 7 is a semiconductor detector, for example. The detector 7 is an energy dispersive X-ray detector, for example. The detector 7 may be a wavelength dispersive X-ray detector.

The specimen tilting mechanism 8 tilts the specimen support plate 5. The specimen tilting mechanism 8 tilts the specimen support plate 5 so that the specimen S is tilted. The specimen tilting mechanism 8 can tilt the specimen S to any desired angle. The specimen tilting mechanism 8 may tilt the specimen support plate 5 by operating a motor, for example, or tilt the specimen support plate 5 by operating a piezoelectric device.

Changing the inclination angle of the specimen S can change the take-off angle of the secondary X-ray emitted from the specimen S. The take-off angle refers to an angle at which the detector 7 detects the X-ray. Namely, the take-off angle is an angle of the X-ray detected by the detector 7 relative to the surface of the specimen S when it is emitted therefrom.

The specimen S is measured in the analyzer main body 10. Specifically, a primary X-ray generated in the X-ray tube 2 passes through the filter 3 and the primary X-ray collimator 4 and irradiates the specimen S. A secondary X-ray emitted from the specimen S when it is irradiated with the primary X-ray travels through the secondary X-ray collimator 6 and is detected by the detector 7. The secondary X-ray is detected by the detector 7 at the take-off angle corresponding to the inclination angle of the specimen S. A signal processing circuit (not shown) performs processing of the outputs (output signals) of the detector 7 such as amplification, digitization, and so on. The processing unit 40 receives output signals from the signal processing circuit and generates an X-ray spectrum.

The operation unit 30 allows a user to input operation information, and outputs the input operation information to the processing unit 40. The operation unit 30 can have its functions implemented by hardware such as a keyboard, mouse, button, touchscreen, touch pad, and so on.

The display unit 32 displays images generated by the processing unit 40. The display unit 32 can have its functions implemented by a liquid crystal display (LCD), cathode ray tube (CRT), or a touchscreen that can also function as the operation unit 30.

The storage unit 34 stores programs and various sets of data that allow a computer to function as various parts of the processing unit 40. The storage unit 34 also functions as a work area of the processing unit 40. The storage unit 34 can have its functions implemented by a hard disk, random access memory (RAM), and so on.

The functions of the processing unit 40 can be implemented by executing programs in various types of hardware such as a processor or central processing unit (CPU), digital signal processor (DSP), and so on. The processing unit 40 includes a take-off angle controller 42, a measurement controller 43, a spectrum generation unit 44, a storage controller 46, and an analysis unit 48.

The take-off angle controller 42 controls the specimen tilting mechanism 8. The take-off angle controller 42 operates the specimen tilting mechanism 8 to tilt the specimen support plate 5, to control the take-off angle of the secondary X-ray.

The measurement controller 43 performs processing for the measurement of the specimen S. The measurement controller 43 causes the analyzer main body 10 to make measurements of the specimen S.

The spectrum generation unit 44 generates an X-ray spectrum based on an output signal output from the detector 7 when the specimen S is measured. Namely, the spectrum generation unit 44 generates an X-ray spectrum based on the detection result of a secondary X-ray by the detector 7.

The storage controller 46 associates the X-ray spectrum generated by the spectrum generation unit 44 with the information for identifying the take-off angle of the secondary X-ray when the X-ray spectrum was acquired, and stores the same in the storage unit 34.

The analysis unit 48 obtains information of an element in the depth direction of the specimen S based on the X-ray spectrum. The information of an element in the depth direction of the specimen S, when the specimen S has a layer structure, for example, is the order of layers, elements contained in layers, layer compositions, and so on.

1.2. Analysis Method

The analysis method using the X-ray fluorescence analyzer 100 includes a step of acquiring a first X-ray spectrum obtained, with a take-off angle of a secondary X-ray being set as a first take-off angle, a step of acquiring a second X-ray spectrum obtained, with a take-off angle of the secondary X-ray being set as a second take-off angle that is different from the first take-off angle, and a step of obtaining information of an element in a depth direction of a specimen S based on the first X-ray spectrum and the second X-ray spectrum.

The analysis method using the X-ray fluorescence analyzer 100 is described in detail below.

1.2.1. Example 1

Figure 2:
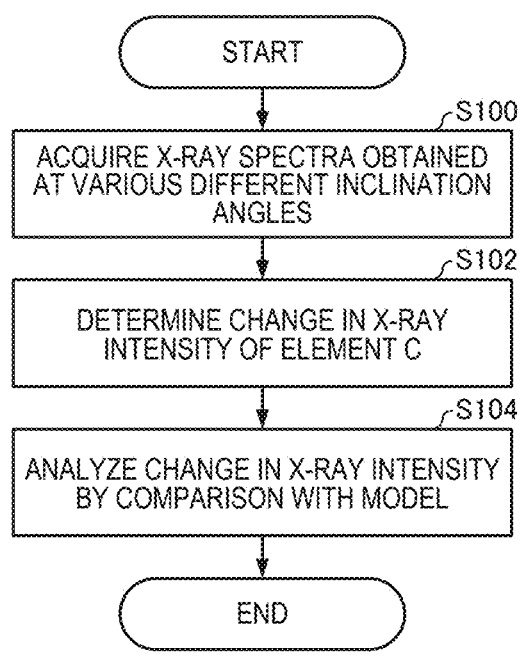
FIG. 2 is a flowchart illustrating an example of an analysis method using an X-ray fluorescence analyzer according to the first embodiment.

FIG. 2 is a flowchart illustrating an example of an analysis method using the X-ray fluorescence analyzer 100.

First, a specimen S is measured using the X-ray fluorescence analyzer 100, to acquire a plurality of X-ray spectra obtained at various different inclination angles (S100).

Figure 3:
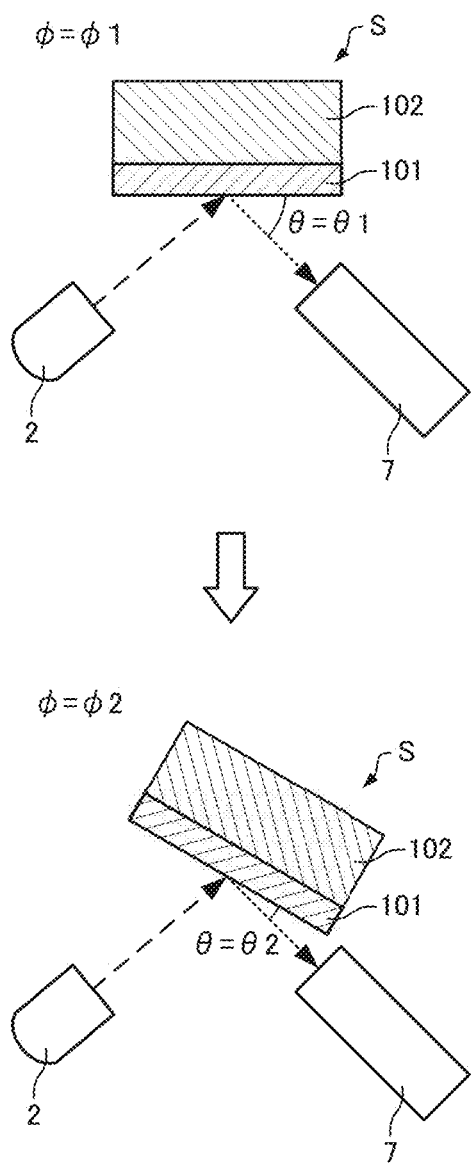
FIG. 3 is a diagram illustrating measurement of a specimen by an X-ray fluorescence analyzer according to the first embodiment.

FIG. 3 is a diagram illustrating measurement of the specimen S by the X-ray fluorescence analyzer 100. The specimen S includes a first layer 101 and a second layer 102 from the front side of the specimen S. The first layer 101 is a plated layer, for example, and the second layer 102 is a matrix, for example.

The first layer 101 contains Element A, and the second layer 102 contains Element B. In Example 1, whether Element C is contained in the first layer 101, or in the second layer 102, is determined.

First, a measurement is made on the specimen S set horizontally (first inclination angle $\varphi1=0°$) as illustrated in FIG. 3 to acquire a first X-ray spectrum. The take-off angle $\theta$ of the secondary X-ray at this time shall be referred to as a first take-off angle $\theta1$.

Next, the specimen S is tilted by the use of the specimen tilting mechanism 8 to change the inclination angle $\varphi$ to a second inclination angle $\varphi2$, and a measurement is made to acquire a second X-ray spectrum. The take-off angle $\theta$ of the secondary X-ray at this time shall be referred to as a second take-off angle $\theta2$. The second take-off angle $\theta2$ is smaller than the first take-off angle $\theta1$ ($\theta2<\theta1$).

Similarly, although not shown, the specimen S is tilted further by the use of the specimen tilting mechanism 8 to a third inclination angle $\varphi3$, and a third X-ray spectrum is acquired. The take-off angle $\theta$ of the secondary X-ray at this time shall be referred to as a third take-off angle $\theta3$. The third take-off angle $\theta3$ is smaller than the second take-off angle $\theta2$ ($\theta3<\theta2$).

Thus, the inclination angle $\varphi$ of the specimen S is changed and a spectrum acquired repeatedly, so that a plurality of X-ray spectra obtained at various different inclination angles $\varphi$ are acquired.

Next, from the plurality of X-ray spectra obtained at various different inclination angles $\varphi$, a change in X-ray intensity of Element C is determined (S102), which is then compared with a model, to determine whether Element C is contained in the first layer 101, or in the second layer 102 (S104).

Figure 4:
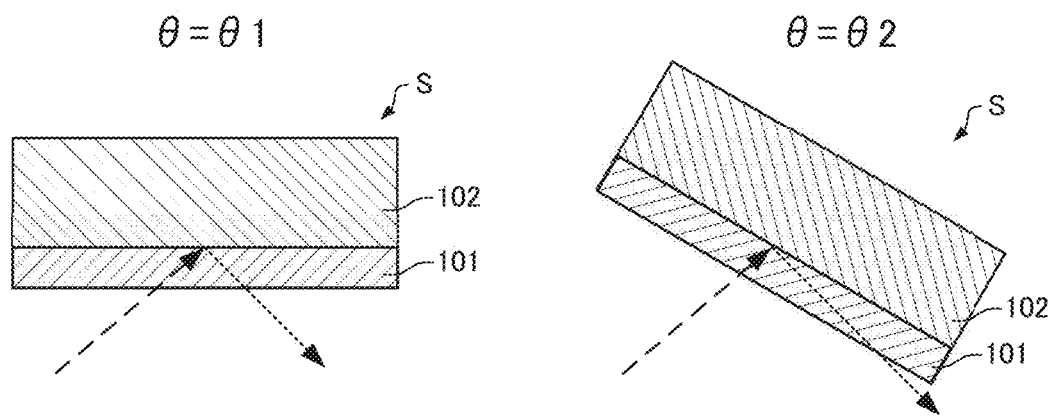
FIG. 4 is a diagram for explaining a relationship between inclination angle and X-ray intensity.

FIG. 4 is a diagram for explaining the relationship between the inclination angle Y and the X-ray intensity.

As illustrated in FIG. 4, when Element C is contained in the second layer 102, increasing the inclination angle $\varphi$ to decrease the take-off angle $\theta$ prolongs the traveling distance of the fluorescent X-ray from Element C through the first layer 101. Therefore, when Element C is contained in the second layer 102, the X-ray intensity decreases as the inclination angle Y increases, i.e., as the take-off angle $\theta$ reduces. On the other hand, when Element C is contained in the first layer 101, the amount of change in the traveling distance of the fluorescent X-ray from Element C through the first layer 101 when the inclination angle $\varphi$ is increased is smaller as compared to when Element C is contained in the second layer 102.

Therefore, when Element C is contained in the second layer 102, the ratio $\Delta I/\Delta\varphi$ of the amount of change $\Delta I$ in the X-ray intensity I to the amount of change $\Delta\varphi$ in the inclination angle $\varphi$ (take-off angle $\theta$) is larger, as compared to when Element C is contained in the first layer 101. Thus, whether Element C is contained in the first layer 101 or in the second layer 102 can be known by determining the ratio $\Delta I/\Delta\varphi$ from the plurality of X-ray spectra obtained at various different inclination angles $\varphi$.

Information regarding an element in the depth direction of the specimen S can be acquired this way by the use of the fact that a larger ratio $\Delta I/\Delta\varphi$ of the amount of change $\Delta I$ in the X-ray intensity I to the amount of change $\Delta\varphi$ in the inclination angle $\varphi$ indicates the presence of the element in a deeper position.

Figure 5:
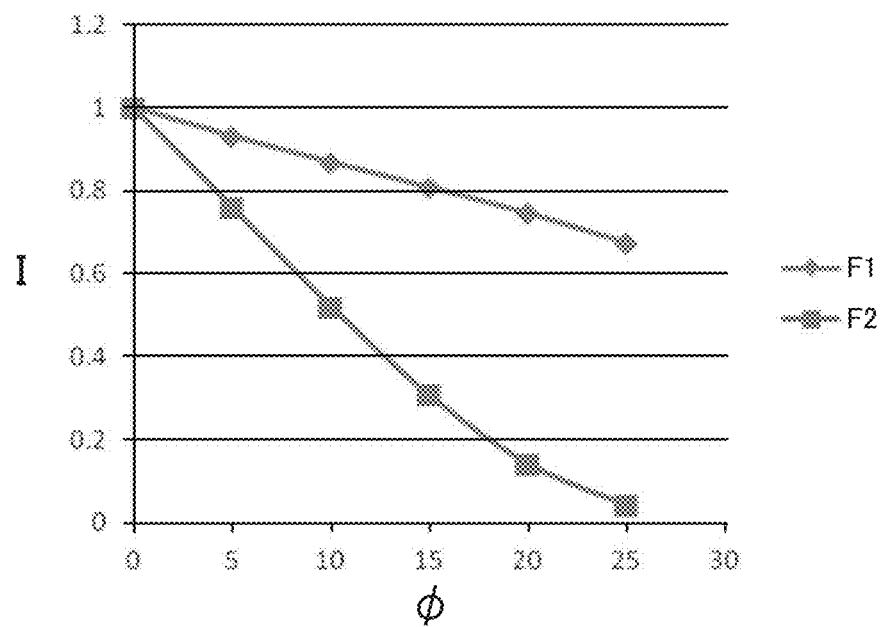
FIG. 5 is a graph of changes in X-ray intensity of an analysis target element in a specimen whose layer structure is known when an inclination angle is changed.

FIG. 5 is a graph of changes in X-ray intensity of Element C in a specimen whose layer structure is known when the inclination angle $\varphi$ is changed. The horizontal axis of the graph in FIG. 5 represents the inclination angle $\varphi$, and the vertical axis represents the X-ray intensity I. The X-ray intensity I is standardized (X-ray intensity=1 when the inclination angle $\varphi=00$).

FIG. 5 illustrates model functions F1 and F2 that represent changes in X-ray intensity obtained from specimens with a known layer structure. Function F1 indicates the changes in X-ray intensity of Element C when Element C is contained in the first layer 101. Function F2 indicates the changes in X-ray intensity of Element C when Element C is contained in the second layer 102.

Functions F1 and F2 can be obtained by a thin-film fundamental parameter (FP) method. The thin-film FP method is a technique for theoretically calculating the intensity of fluorescent X-rays based on the types and compositions of elements making up a specimen.

Functions F1 and F2 may be calibration curves obtained through measurements of reference specimens. For example, Function F1 may be obtained by plotting the X-ray intensities of Element C in the X-ray spectra of a reference specimen that contains Element C in the first layer 101 respectively acquired at inclination angles φ of 0°, 5°, 10°, 15°, 20°, and 25°. Similarly, Function F2 can be obtained using a reference specimen containing Element C in the second layer 102.

As illustrated in FIG. 5, Function F2 has a larger gradient than Function F1. Here, the gradient corresponds to the ratio ΔI/Δφ of the amount of change ΔI in the X-ray intensity I to the amount of change Δφ in the inclination angle φ. Namely, the gradient corresponds to the ratio ΔI/Δθ of the amount of change ΔI in the X-ray intensity I to the amount of change Δθ in the take-off angle θ of the secondary X-ray.

Therefore, whether Element C is contained in the first layer 101 or in the second layer 102 can be determined based on the gradient of the function representing the changes in the X-ray intensity I of the analysis target element.

Specifically, X-ray intensities of Element C in a plurality of X-ray spectra obtained at various different inclination angles φ are plotted to obtain Function FS on the graph in FIG. 5. Function FS represents the changes in X-ray intensity of an analysis target element when the inclination angle φ (take-off angle θ) is changed.

When the gradient of Function FS is closer to that of Function F1, it can be said that Element C is contained in the first layer 101. When the gradient of Function FS is closer to that of Function F2, it can be said that Element C is contained in the second layer 102.

While Function FS above is obtained from three or more X-ray spectra of the specimen S, Function FS can be deduced from at least two X-ray spectra.

1.2.2. Example 2

In Example 2, the specimen S includes a first layer 101 and a second layer 102 as with Example 1. The first layer 101 contains Element A and Element C, and the second layer 102 contains Element B and Element C. In Example 2, the ratio of the content of Element C in the first layer 101 to the content of Element C in the second layer 102 is determined.

Figure 6:
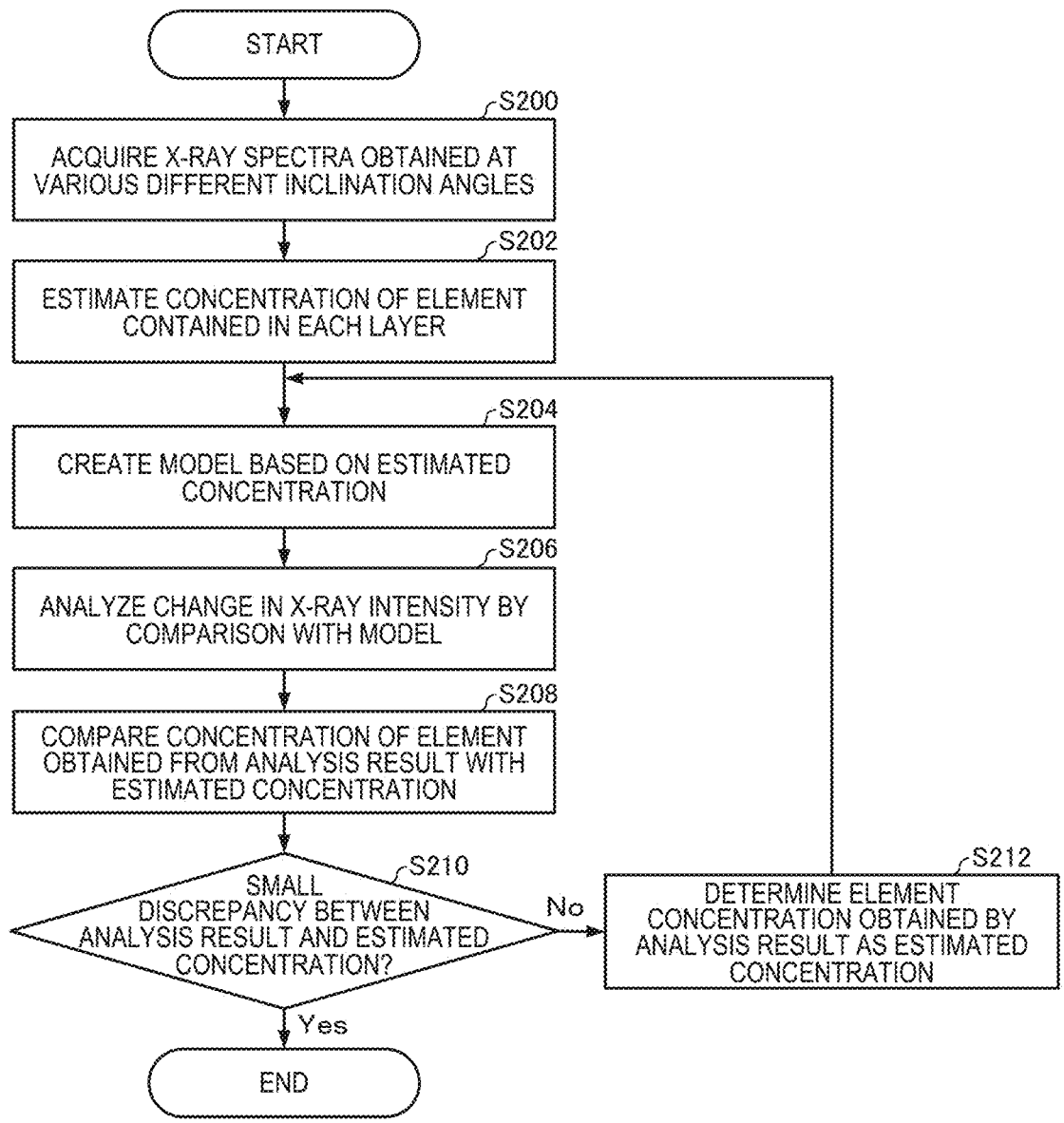
FIG. 6 is a flowchart illustrating an example of an analysis method using an X-ray fluorescence analyzer according to the first embodiment.

FIG. 6 is a flowchart illustrating an example of an analysis method using the X-ray fluorescence analyzer 100.

First, the inclination angle φ of the specimen S is changed and a spectrum acquired repeatedly, so that a plurality of X-ray spectra obtained at various different inclination angles φ are acquired (S200). This step is carried out similarly to step S100 in FIG. 2.

Next, respective concentrations of elements contained in the first layer 101 and elements contained in the second layer 102 are estimated (S202).

For example, respective K-ratios of elements making up the specimen S are determined from X-ray spectra measured as required, and respective estimated concentrations of the elements are determined from the K-ratios. The K-ratio is a relative intensity, i.e., an X-ray intensity relative to the X-ray intensity of 1 of a pure element.

For example, respective K-ratios of elements making up the specimen S are determined from X-ray spectra that are obtained by measuring the specimen S set horizontally. Here, it is assumed that the K-ratios of Element A, Element B, and Element C are 0.5, 0.4, and 0.1, respectively.

Supposing that the ratio of the content of Element C in the first layer 101 to the content of Element C in the second layer 102 is 1:1, the K-ratios of Element A and Element C in the first layer 101 are 0.5 and 0.1/2=0.05, respectively. The K-ratios of Element B and Element C in the second layer 102 are 0.4 and 0.1/2=0.05, respectively.

Accordingly, the concentrations of Elements A and C in the first layer 101 are respectively estimated as 91% and 9%, and the concentrations of Element B and Element C in the second layer 102 are respectively estimated as 89% and 11%.

Next, a model is created based on the estimated concentrations determined at step S202 (S204), and by comparing Function FS with this model, the ratio of the content of Element C in the first layer 101 to the content of Element C in the second layer 102 is determined (S206).

Figure 7:
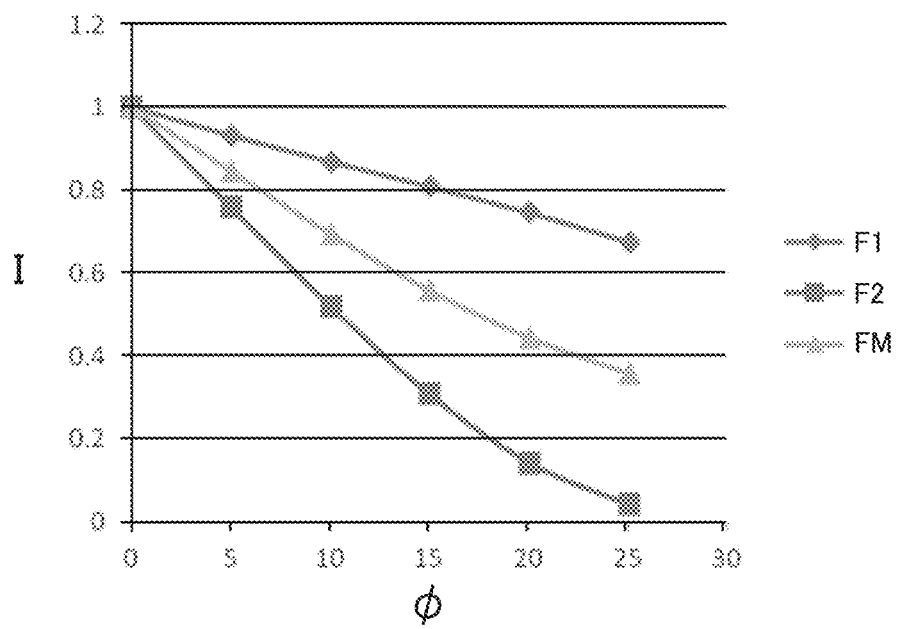
FIG. 7 is a graph of changes in X-ray intensity of an analysis target element of a specimen whose layer structure is known when an inclination angle is changed.

FIG. 7 is a graph of changes in X-ray intensity of Element C in a specimen whose layer structure is known when the inclination angle φ is changed.

FIG. 7 illustrates Function F1 and Function F2. FIG. 7 also illustrates a model function, Function FM. Function FM represents the changes in X-ray intensity I of an analysis target element, created by theoretical calculations based on the estimated concentrations determined at step S202.

Function FM can be created by the thin-film FP method if concentrations of elements contained in each layer are known. Namely, Function FM can be created if concentrations of Elements A and C contained in the first layer 101, and concentrations of Elements B and C contained in the second layer 102 are known. At step S204, Function FM is created based on the estimated concentrations of Elements A and C contained in the first layer 101 and the estimated concentrations of Elements B and C contained in the second layer 102 determined at step S202.

As illustrated in FIG. 7, the gradient of Function FM has a value in between the gradients of Function F1 and Function F2. Namely, the amount of change in X-ray intensity I when Element C is contained both in the first layer 101 and the second layer 102 has a value in between the amount of change in X-ray intensity I when Element C is contained in the first layer 101 and the amount of change in X-ray intensity I when Element C is contained in the second layer 102.

The X-ray intensity at an inclination angle φ is expressed by the following equation:

$$I_\varphi = a \cdot I_{1\varphi} + b \cdot I_{2\varphi} \quad (1)$$

where $I_\varphi$ represents the X-ray intensity of an analysis target element at an inclination angle of φ. $I_{1\varphi}$ represents the X-ray intensity of the analysis target element contained in the first layer 101 at the inclination angle of φ. $I_{2\varphi}$ represents the X-ray intensity of the analysis target element contained in the second layer 102 at the inclination angle of φ. "a" is the ratio of the X-ray intensity of the analysis target element contained in the first layer 101 to the X-ray intensity of the analysis target element, and "b" is the ratio of the X-ray intensity of the analysis target element contained in the second layer 102 to the X-ray intensity of the analysis target element. a+b=1.

The analysis at step S206 involves comparison of Function FS representing changes in the X-ray intensity I of Element C and Function FM. The ratios a and b in the equation (1) above are obtained by comparing Function FS with Function FM.

The above equation (1) applies to every inclination angle φ. The ratios a and b are obtained from the above equation (1) for each inclination angle φ, and the most probable ratios a and b are determined by using the least squares method.

Thus, the ratio of the content of Element C in the first layer 101 to the content of Element C in the second layer 102 can be determined.

When the estimated concentrations differ largely from the actual concentrations of elements contained in each layer of the specimen S, Function FM cannot be created correctly by the thin-film FP method. For this reason, the concentration of the element obtained from the analysis result at S206 is compared with the estimated concentration (S208).

In this step, for example, the concentration of the element obtained from the analysis result is compared with the estimated concentration, and it is determined whether or not the discrepancy between the concentration of the element obtained from the analysis result and the estimated concentration is larger than a preset value.

For example, the concentration of Element C in the first layer 101 obtained from the analysis result is compared with the estimated concentration of Element C in the first layer 101, and it is determined whether or not the discrepancy between them is larger than a preset value.

If the discrepancy between the concentration of the element obtained from the analysis result and the estimated concentration is larger than a preset value (S210: No), the concentration of the element obtained from the analysis result is determined as the estimated concentration (S212). The process goes back to step S204, where the model (Function FM) is created based on the estimated concentration. The newly created function FM is compared with Function FS, and the ratio of the content of Element C in the first layer 101 to the content of Element C in the second layer 102 is determined (S206).

In this way, until the discrepancy between the concentration of the element obtained from the analysis result and the estimated concentration becomes smaller than a preset value, steps S204, S206, S208, S210, and S212 are repeated.

When the discrepancy between the concentration of the element obtained from the analysis result and the estimated concentration does not exceed the preset value (S210: Yes), it can be determined that the analysis result is probable.

The ratio of the content of Element C in the first layer 101 to the content of Element C in the second layer 102 can be determined by the process steps described above.

The method of estimating the concentration of an element contained in each layer is not limited to that of the process step S202 described in the example above wherein respective K-ratios of elements are determined from X-ray spectra measured as required, based on which the concentrations are estimated. Estimated concentrations can be set to any values. Even when the discrepancy between the estimated concentration and the actual concentration of the element is large, for example, probable analysis results can be obtained by repeating steps S204, S206, S208, S210, and S212.

1.2.3. Example 3

In Example 3, the specimen S includes a first layer 101 and a second layer 102 as with Example 1. In Example 3, the ratio of elements contained in each layer is determined. Namely, it is determined in which layer Elements A, B, and C are contained, and in what ratio.

Figure 8:
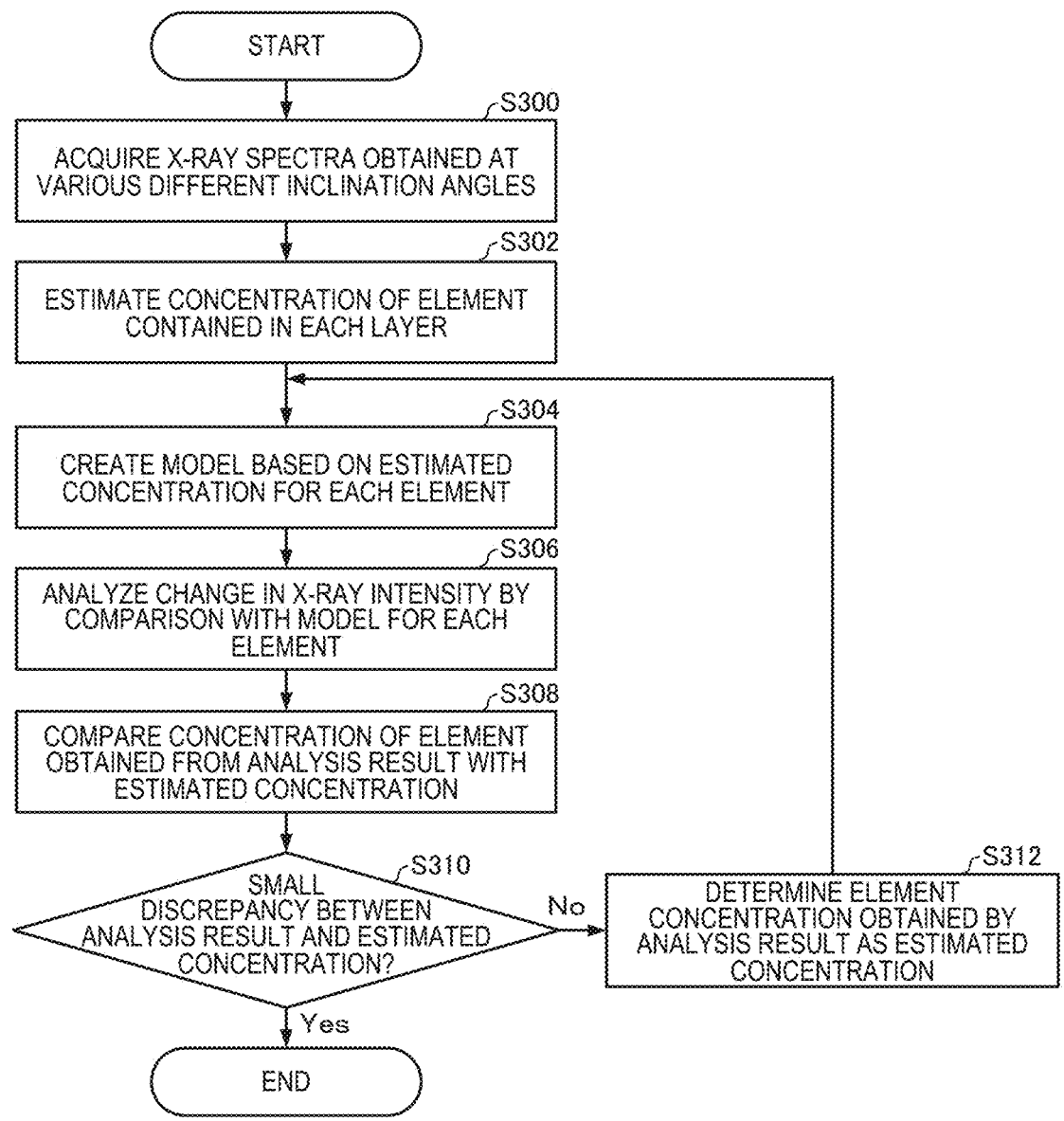
FIG. 8 is a flowchart illustrating an example of an analysis method using an X-ray fluorescence analyzer according to the first embodiment.

FIG. 8 is a flowchart illustrating an example of an analysis method using the X-ray fluorescence analyzer 100.

First, the inclination angle φ of the specimen S is changed and a spectrum acquired repeatedly, so that a plurality of X-ray spectra obtained at various different inclination angles φ are acquired (S300). This step is carried out similarly to step S100 in FIG. 2.

Next, respective concentrations of elements contained in the first layer 101 and elements contained in the second layer 102 are estimated (S302).

In this step S302, respective estimated concentrations of elements are determined by the method similar to that of step S202 in FIG. 6 and described above.

Here, it is assumed that the K-ratios of Element A, Element B, and Element C are 0.5, 0.4, and 0.1, respectively.

Supposing that the ratio of the content of Element A in the first layer 101 to the content of Element A in the second layer 102 is 1:1; the ratio of the content of Element B in the first layer 101 to the content of Element B in the second layer 102 is 1:1; and the ratio of the content of Element C in the first layer 101 to the content of Element C in the second layer 102 is 1:1, the K-ratios of Element A, Element B, and Element C in the first layer 101 are 0.25, 0.2, and 0.05, respectively. Accordingly, the concentrations of Elements A, B and C in the first layer 101 are respectively estimated as 50%, 40%, and 10%.

The K-ratios of Element A, Element B, and Element C in the second layer 102 are 0.25, 0.2, and 0.05, respectively. Accordingly, the concentrations of Elements A, B and C in the second layer 102 are respectively estimated as 50%, 40%, and 10%.

Next, a model is created based on the estimated concentrations determined at step S302 (S304) for each element, and by comparing the model created for each element with Function FS created for each element, the ratio of the elements contained in each layer is determined (S306).

Figure 9:
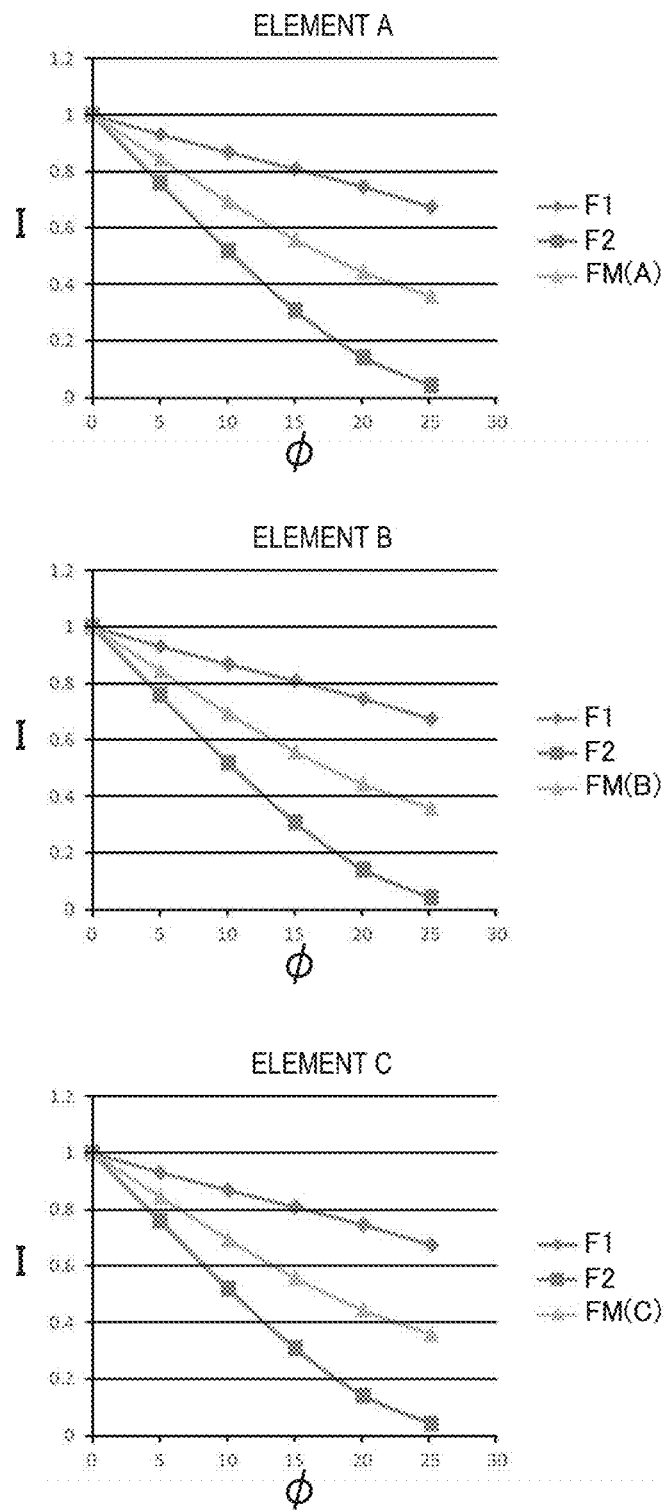
FIG. 9 illustrates graphs indicating changes in X-ray intensity of analysis target elements in a specimen whose layer structure is known when an inclination angle is changed.

FIG. 9 illustrates graphs indicating changes in X-ray intensity of Element A, changes in X-ray intensity of Element B, and changes in X-ray intensity of Element C in a specimen whose layer structure is known when the inclination angle φ is changed.

In this step, first, the ratio of the content of Element A in the first layer 101 to the content of Element A in the second layer 102 is determined by the method described above in Example 2. Specifically, Function FM(A) representing the changes in X-ray intensity of Element A is created based on the estimated concentrations determined at step S302. Function FS(A), which indicates the changes in X-ray intensity I of Element A is also determined from the plurality of X-ray spectra obtained at various different inclination angles φ. Then Function FS(A) is compared with Function FM(A). Thus, the ratio of the content of Element A in the first layer 101 to the content of Element A in the second layer 102 can be determined.

Similarly, the ratio of the content of Element B in the first layer 101 to the content of Element B in the second layer 102 is determined. Specifically, Function FM(B) representing the changes in X-ray intensity of Element B is created based on the estimated concentrations determined at step S302. Function FS(B), which indicates the changes in X-ray intensity I of Element B is also determined from the plurality of X-ray spectra obtained at various different inclination angles φ. Then Function FS(B) is compared with Function FM(B).

Thus, the ratio of the content of Element B in the first layer 101 to the content of Element B in the second layer 102 can be determined.

Similarly, the ratio of the content of Element C in the first layer 101 to the content of Element C in the second layer 102 is determined. Specifically, Function FM(C) representing the changes in X-ray intensity of Element C is created based on the estimated concentrations determined at step S302. Function FS(C), which indicates the changes in X-ray intensity I of Element C is also determined from the plurality of X-ray spectra obtained at various different inclination angles φ. Then Function FS(C) is compared with Function FM(C). Thus, the ratio of the content of Element C in the first layer 101 to the content of Element C in the second layer 102 can be determined.

Next, the concentration of the element obtained from the analysis result is compared with the estimated concentration (S308). If the discrepancy between the concentration of the element obtained from the analysis result and the estimated concentration is larger than a preset value (S310: No), the concentration of the element obtained from the analysis result is determined as the estimated concentration (S312). The process goes back to step S304, where the models for each element (Function FM(A), Function FM(B), and Function FM(C)) are created based on the estimated concentrations. The newly created functions FM(A), FM(B), and FM(C) are compared with Function FS(A), FS(B), and FS(C), respectively, and the ratio of the elements in each layer is determined.

In this way, until the discrepancy between the concentration of the element obtained from the analysis result and the estimated concentration becomes smaller than a preset value, steps S304, S306, S308, S310, and S312 are repeated.

When the discrepancy between the concentration of the element obtained from the analysis result and the estimated concentration does not exceed the preset value (S310: Yes), it can be determined that the analysis result is probable.

The ratio of the elements in each layer can be determined by the process steps described above.

While one case is described above where the specimen S is made up of three elements, Elements A, B, and C, an analysis can be made similarly when the specimen S is made up of more than three elements.

1.2.4. Example 4

Figure 10:
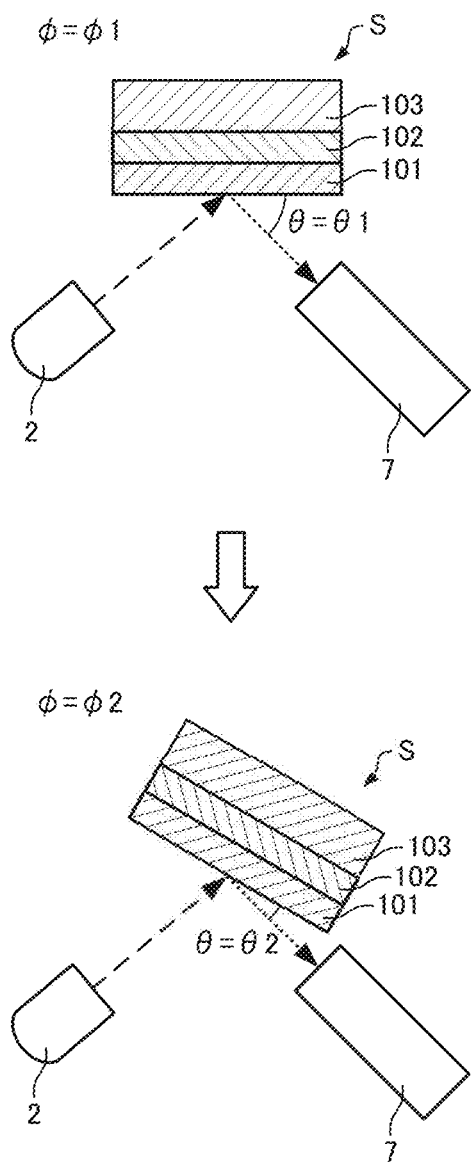
FIG. 10 is a diagram illustrating measurement of a specimen by an X-ray fluorescence analyzer according to the first embodiment.

FIG. 10 is a diagram illustrating measurement of the specimen S by the X-ray fluorescence analyzer 100.

In Example 4, as illustrated in FIG. 10, the specimen S includes a first layer 101, a second layer 102, and a third layer 103. In Example 4, the ratio of elements contained in each layer is determined.

The analysis method in Example 4 is carried out through similar steps as those of the analysis method in Example 3 illustrated in FIG. 8 and described above. Therefore, the features different from Example 3 are described with reference to FIG. 8, while the similar features are not described again.

At step S302, respective concentrations of elements contained in the first layer 101, elements contained in the second layer 102, and elements contained in the third layer 103 are estimated.

Even with a larger number of layers, the respective concentrations of elements can be estimated by the method similar to that of step S302 in FIG. 8 and described above where there are two layers.

For example, let us assume that the K-ratios of Element A, Element B, Element C, and Element D are 0.3, 0.3, 0.3, and 0.1, respectively.

Supposing that the ratio of the content of Element A in the first layer 101 to the content of Element A in the second layer 102 to the content of Element A in the third layer 103 is 1:1:1; the ratio of the content of Element B in the first layer 101 to the content of Element B in the second layer 102 to the content of Element B in the third layer 103 is 1:1:1; and the ratio of the content of Element C in the first layer 101 to the content of Element C in the second layer 102 to the content of Element C in the third layer 103 is 1:1:1, the K-ratios of Element A, Element B, Element C, and Element D in the first layer 101 are 0.1, 0.1, 0.1, and 0.033 (=0.1/3), respectively. Accordingly, the concentrations of Elements A, B, C and D in the first layer 101 are respectively estimated as 30%, 30%, 30%, and 10%.

The concentrations of elements contained in the second layer 102 and in the third layer 103 can be estimated similarly to the case of the first layer 101. For example, the concentrations of Elements A, B, C and D in the second layer 102 and in the third layer 103 are respectively estimated similarly to the case of the first layer 101 as 30%, 30%, 30%, and 10%.

At step S304, a model is created based on the estimated concentrations determined at step S302 for each element, and at step S306, by comparing the model created for each element with Function FS created for each element, the ratio of the elements contained in each layer is determined.

At step S304, first, Function FM(A) representing the changes in X-ray intensity of Element A is created based on the estimated concentrations determined at step S302. At step S306, Function FS(A), which indicates the changes in X-ray intensity I of Element A, is determined from the plurality of X-ray spectra obtained at various different inclination angles φ, and Function FS(A) and Function FM(A) are compared.

The following equation (2) is used in the analysis at step S306.

$$I_\varphi = a \cdot I_{1\varphi} + b \cdot I_{2\varphi} + c \cdot I_{3\varphi} \tag{2}$$

where $I_\varphi$ represents the X-ray intensity of an analysis target element at an inclination angle of φ. $I_{1\varphi}$ represents the X-ray intensity of the analysis target element contained in the first layer 101 at the inclination angle of φ. $I_{2\varphi}$ represents the X-ray intensity of the analysis target element contained in the second layer 102 at the inclination angle of φ. "a" is the ratio of the X-ray intensity of the analysis target element contained in the first layer 101 to the X-ray intensity of the analysis target element, "b" is the ratio of the X-ray intensity of the analysis target element contained in the second layer 102 to the X-ray intensity of the analysis target element, and "c" is the ratio of the X-ray intensity of the analysis target element contained in the third layer 103 to the X-ray intensity of the analysis target element. a+b+c=1.

The analysis at step S306 involves comparison of Function FS(A) representing changes in the X-ray intensity I of Element A and Function FM(A). The ratios a, b, and c in the equation (2) above are obtained by comparing Function FS(A) with Function FM(A). Thus, the ratio of the content of Element A in the first layer 101 to the content of Element A in the second layer 102 to the content of Element A in the third layer 103 can be determined.

Similarly to the example of Element A, the ratio of the content of Element B in the first layer 101 to the content of Element B in the second layer 102 to the content of Element B in the third layer 103 is determined. Similarly to the example of Element A, the ratio of the content of Element C in the first layer 101 to the content of Element C in the second layer 102 to the content of Element C in the third layer 103 is determined. Similarly to the example of Element A, the ratio of the content of Element D in the first layer 101 to the content of Element D in the second layer 102 to the content of Element D in the third layer 103 is determined.

This way, even with a larger number of layers, the ratio of elements contained in each layer can be determined by the method similar to that of steps S304 and S306 in FIG. 8 and described above where there are two layers.

The other steps are similar to those of Example 3 illustrated in FIG. 8 and described above.

While one case is described above where the specimen S is made up of four elements, Elements A, B, C and D, an analysis can be made similarly when the specimen S is made up of more than four elements. Also, while the number of layers is 3 in the case described above, the analysis can be made similarly if when the number of layers is more than 3.

1.3. Operation of X-Ray Fluorescence Analyzer

Figure 11:
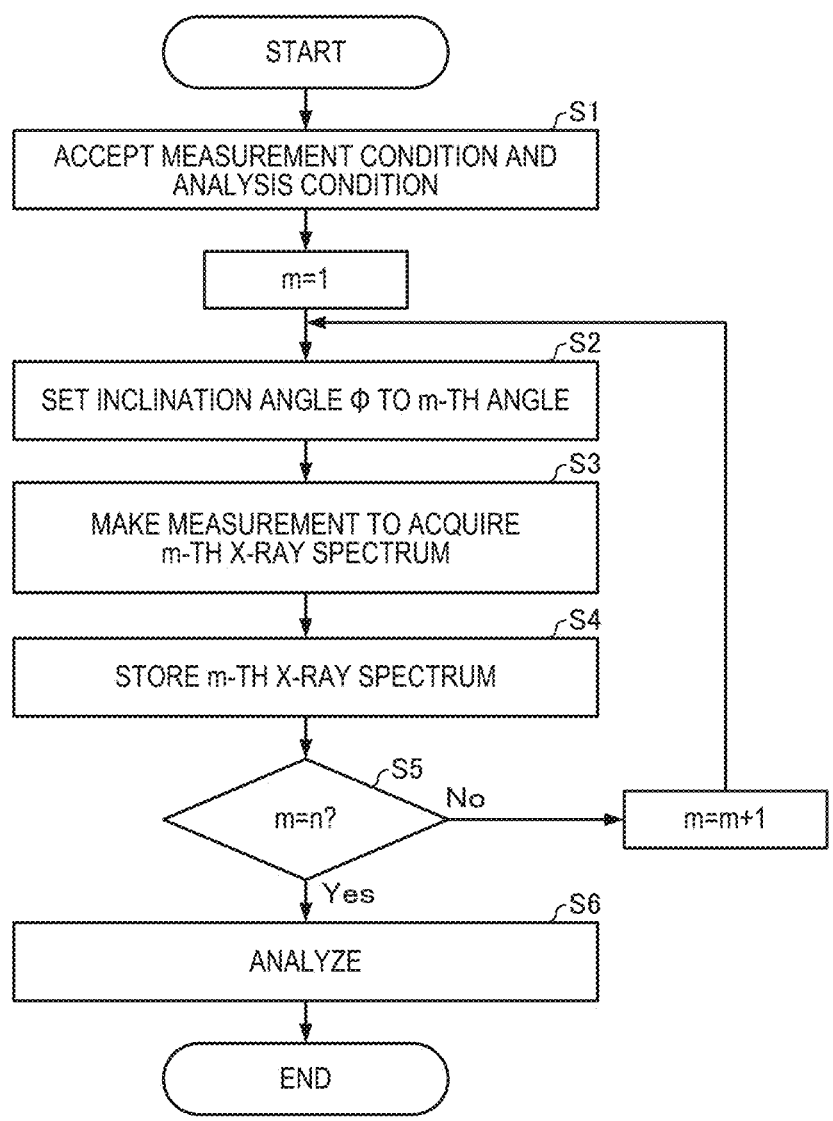
FIG. 11 is a flowchart illustrating an example of an operation of an X-ray fluorescence analyzer according to the first embodiment.

FIG. 11 is a flowchart illustrating an example of an operation of the X-ray fluorescence analyzer 100.

First, when a user inputs measurement conditions and analysis conditions via the operation unit 30, the processing unit 40 accepts the measurement conditions (S1) and starts analyzing the specimen S.

The measurement conditions include the number n of X-ray spectra, the increment of angle when changing the inclination angle φ, tube voltage, tube current, and so on. The analysis conditions are preconditions for creating a model by the thin-film FP method. The analysis conditions include, for example, the number of layers, the order of layers, the constituent elements of each layer, and so on. The analysis conditions vary depending on the purpose of analysis, as demonstrated in Examples 1 to 4.

First, the take-off angle controller 42 operates the specimen tilting mechanism 8 to set the specimen S horizontal (first inclination angle φ1=0°) (S2). The take-off angle θ is thus set to a first take-off angle θ1.

The measurement controller 43 causes the analyzer main body 10 to make a measurement of the specimen S (S3). As a result, the spectrum generation unit 44 generates a first X-ray spectrum.

The storage controller 46 associates the first X-ray spectrum generated by the spectrum generation unit 44 with the information for identifying the take-off angle θ when the first X-ray spectrum was acquired, and stores the same in the storage unit 34 (S4). Thus, the first inclination angle φ 1 and the first X-ray spectrum acquired at the first inclination angle φ 1 are stored in association with each other in the storage unit 34.

While the inclination angle φ is stored as the information for identifying the take-off angle θ in the case described above, the information for identifying the take-off angle θ may be anything as long as it can specify the take-off angle θ. For example, the take-off angle θ itself can be used as the information for identifying the take-off angle θ. Namely, the first X-ray spectrum may be stored in association with the first take-off angle θ1 in the storage unit 34.

Next, the take-off angle controller 42 operates the specimen tilting mechanism 8 to change the inclination angle of the specimen S by the increment specified in the measurement conditions (S2). This changes the inclination angle φ of the specimen S from the first inclination angle φ1 to a second inclination angle φ2, so that the take-off angle θ is changed from the first take-off angle θ1 to a second take-off angle θ2.

In this state, the measurement controller 43 causes the analyzer main body 10 to make a measurement of the specimen S (S3). As a result, the spectrum generation unit 44 generates a second X-ray spectrum.

The storage controller 46 stores the second X-ray spectrum generated by the spectrum generation unit 44 in association with the second inclination angle φ2 in the storage unit 34 (S4).

Next, the processing unit 40 determines whether or not the number of repetitions m equals to n. If m=n is not satisfied (S5: No), m is incremented by 1 (m=m+1), and the inclination angle φ is changed (S2), the X-ray spectrum is measured (S3), and the X-ray spectrum is recorded (S4).

On the other hand, if m=n is satisfied (S5: Yes), the analysis unit 48 makes an analysis based on the first to n-th X-ray spectra and the first to n-th inclination angles (S6).

In this way, the steps of changing the inclination angle φ (S2), measuring the X-ray spectrum (S3), and recording the X-ray spectrum (S4) are repeated until the n-th spectrum is obtained. Thus, the first to n-th X-ray spectra associated with the first to n-th inclination angles are stored in the storage unit 34.

The analysis unit 48 performs an analysis using the analysis methods described in Examples 1 to 4 above. The type of analysis to be performed is determined based on the analysis conditions, for example.

For example, the analysis unit 48 reads out information of the first to n-th X-ray spectra and the first to n-th inclination angles from the storage unit 34 to acquire the information of the first to n-th X-ray spectra and the first to n-th inclination angles. The analysis unit 48 then determines Function FS representing the changes in X-ray intensity of an analysis target element based on the first to n-th X-ray spectra and the first to n-th inclination angles. The analysis unit 48 then obtains information of an element in the depth direction of the specimen S based on the gradient of Function FS, i.e., the ratio of an amount of change in X-ray intensity I of the analysis target element to an amount of change in inclination angle φ (take-off angle θ).

For example, the analysis unit 48 obtains information of an element in the depth direction of the specimen S by creating a model (function) by the thin-film FP method and comparing the model with Function FS.

The analysis conditions input by the user, for example, can be used as the conditions when creating a model by the thin-film FP method. The preconditions of the analysis of Example 2, for example, are that the first layer 101 contains Element A and Element C, and the second layer 102 contains Element A and Element C. The user thus inputs this information as analysis conditions. The analysis unit 48 takes these conditions into account and creates Function FM by the thin-film FP method. Thus, the analysis of Example 2 can be carried out.

When performing the analysis of Example 3 or Example 4, for example, the analysis unit 48 estimates concentrations based on X-ray spectra acquired as needed, to be used when creating a model by the thin-film FP method.

The analysis unit 48 shows the analysis results in the display unit 32. The processing unit 40 then ends the processing.

1.4. Advantageous Effects

The analysis method using the X-ray fluorescence analyzer 100 includes a step of acquiring a first X-ray spectrum obtained, with a take-off angle θ of a secondary X-ray being set as a first take-off angle θ1, a step of acquiring a second X-ray spectrum obtained, with a take-off angle θ of the secondary X-ray being set as a second take-off angle θ2 that is different from the first take-off angle θ1, and a step of obtaining information of an element in a depth direction of a specimen S based on the first X-ray spectrum and the second X-ray spectrum.

The analysis method using the X-ray fluorescence analyzer 100 utilizes the fact that a larger ratio ΔI/Δθ of an amount of change ΔI in X-ray intensity I to an amount of change Δθ in take-off angle θ indicates the presence of an element at a deeper position to allow acquisition of information of an element in a depth direction of a specimen based on the first X-ray spectrum and the second X-ray spectrum. Thus, this analysis method enables acquisition of information of an element in a depth direction of a specimen with the use of the X-ray fluorescence analyzer 100.

The analysis method using the X-ray fluorescence analyzer 100 includes a step of changing the first take-off angle θ1 of the secondary X-ray to the second take-off angle θ2 by tilting the specimen S. Thus, the take-off angle θ can be readily changed.

The analysis method using the X-ray fluorescence analyzer 100 includes a step of acquiring a third X-ray spectrum obtained, with a take-off angle θ of the secondary X-ray being set as a third take-off angle θ3. In the step of obtaining information of an element in a depth direction of a specimen, the information of the element in the depth direction of the specimen is acquired based on the first X-ray spectrum, second X-ray spectrum, and third X-ray spectrum. Thus, information of an element in a depth direction of a specimen S can be obtained with the analysis method using the X-ray fluorescence analyzer 100.

The analysis method using the X-ray fluorescence analyzer 100 acquires information of an element in a depth direction of a specimen S based on the ratio ΔI/Δθ of an amount of change ΔI in X-ray intensity I to an amount of change Δθ in take-off angle θ. For example, information of an element in a depth direction of a specimen S can be obtained easily by comparison with a model created by the thin-film FP method or a calibration curve obtained by measuring a reference specimen.

The X-ray fluorescence analyzer 100 includes a specimen tilting mechanism 8 that controls the inclination angle φ of the specimen S. The inclination angle φ of the specimen S corresponds to the take-off angle θ on one-on-one basis. Thus, it follows that the X-ray fluorescence analyzer 100 includes a mechanism that makes the take-off angle θ variable. Thus, the X-ray fluorescence analyzer 100 can obtain information of an element in a depth direction of a specimen by utilizing the fact that a larger ratio ΔI/Δθ indicates the presence of an element at a deeper position.

The X-ray fluorescence analyzer 100 includes a storage unit 34, and a storage controller 46 that associates an X-ray spectrum acquired by detecting a secondary X-ray with the detector 7 with information for identifying a take-off angle θ of the secondary X-ray when the X-ray spectrum was acquired, and stores the X-ray spectrum in the storage unit 34. Thus, the X-ray fluorescence analyzer 100 can readily obtain data in which the X-ray spectrum is associated with the information for identifying the take-off angle θ when the X-ray spectrum was acquired. Thus, the X-ray fluorescence analyzer 100 can readily obtain the information of the element in the depth direction of the specimen S.

The X-ray fluorescence analyzer 100 includes an analysis unit 48 that obtains information of an element in a depth direction of a specimen S based on an X-ray spectrum. The analysis unit 48 performs the step of reading out a first X-ray spectrum obtained, with a take-off angle θ of a secondary X-ray set being as a first take-off angle θ1 from the storage unit 34, the step of reading out a second X-ray spectrum obtained, with a take-off angle θ of the secondary X-ray being set as a second take-off angle θ2 from the storage unit 34, and the step of obtaining information of the element in the depth direction of the specimen S based on the first X-ray spectrum and the second X-ray spectrum. The analysis unit 48 obtaining the information of the element in the depth direction of the specimen S this way allows the X-ray fluorescence analyzer 100 to readily obtain the information of the element in the depth direction of the specimen S.

Figure 12:
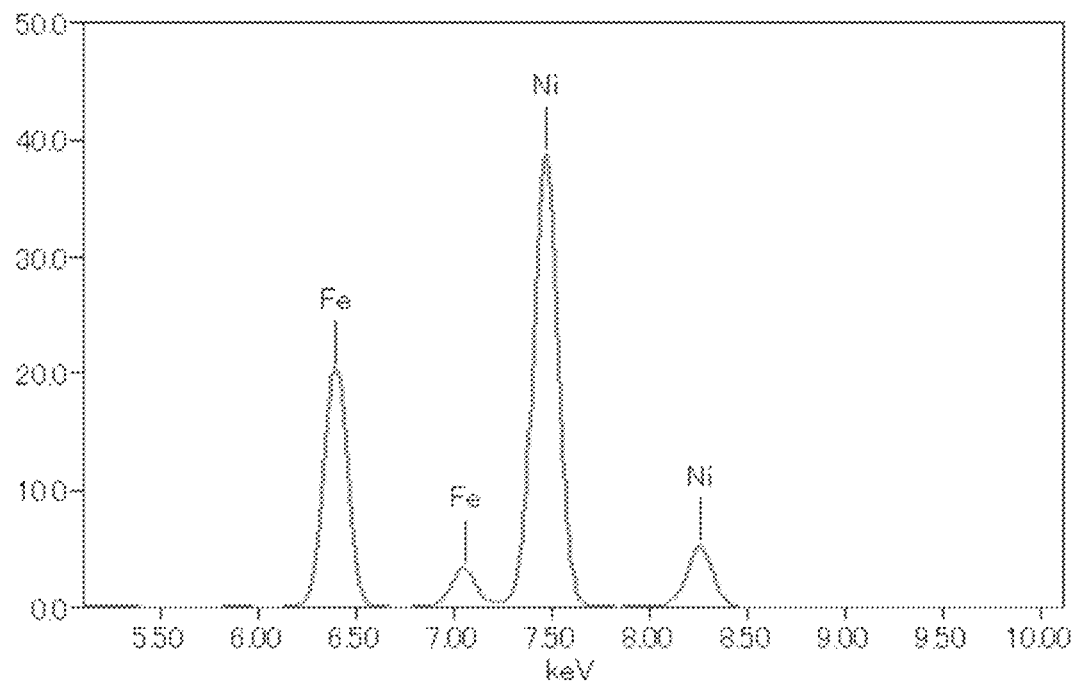
FIG. 12 is a graph illustrating an X-ray spectrum obtained by an X-ray fluorescence analyzer according to a reference example.

FIG. 12 is a graph illustrating an X-ray spectrum obtained by an X-ray fluorescence analyzer without a mechanism for making the take-off angle θ variable according to a reference example. In FIG. 12, the first layer 101 contains nickel, and the second layer 102 contains iron.

As illustrated in FIG. 12, the iron and nickel peaks are discernible in the X-ray spectrum obtained by the reference X-ray fluorescence analyzer. However, which of the layers contains iron or nickel cannot be determined.

In contrast, the X-ray fluorescence analyzer 100 can determine which layer contains iron or nickel by performing the analysis based on a plurality of X-ray spectra obtained at various different take-off angles θ as described above.

Figure 13:
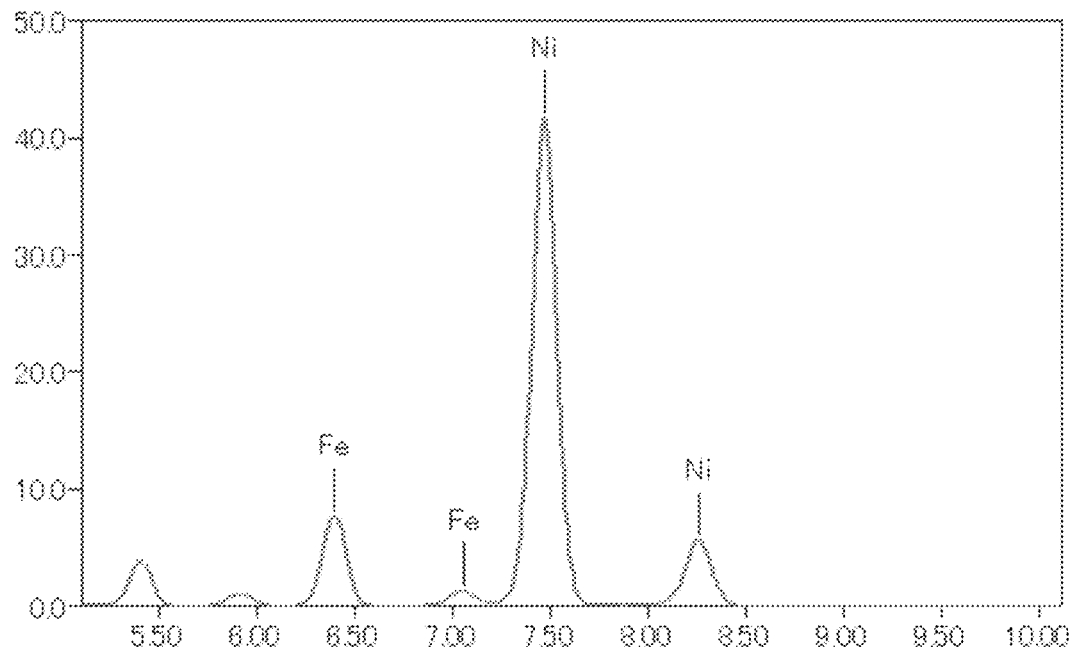
FIG. 13 is a diagram illustrating an X-ray spectrum obtained by an X-ray fluorescence analyzer according to a reference example.

FIG. 13 is a diagram illustrating an X-ray spectrum obtained by an X-ray fluorescence analyzer without a mechanism for making the take-off angle θ variable according to a reference example. In FIG. 13, the first layer 101 contains nickel, and the second layer 102 contains chromium, iron, and nickel.

As illustrated in FIG. 13, the peaks of the nickel in the first layer 101 and in the second layer 102 overlap in the X-ray spectrum obtained by the reference X-ray fluorescence analyzer, because of which the content of nickel in the first layer 101 and the content of nickel in the second layer 102 cannot be determined.

In contrast, the X-ray fluorescence analyzer 100 can ascertain the ratio of the nickel contents in the first layer 101 and the second layer 102 by performing the analysis based on a plurality of X-ray spectra obtained at various different take-off angles θ as described above.

When measuring the layer thickness with the reference X-ray fluorescence analyzer, for example, the user had to input the constituent elements of each layer. In contrast, the information of the constituent elements of each layer can be obtained as described above with the X-ray fluorescence analyzer 100 so that the user can measure the layer thickness without having to input the information of the constituent elements of each layer.

2. Second Embodiment

2.1. X-Ray Fluorescence Analyzer

Figure 14:
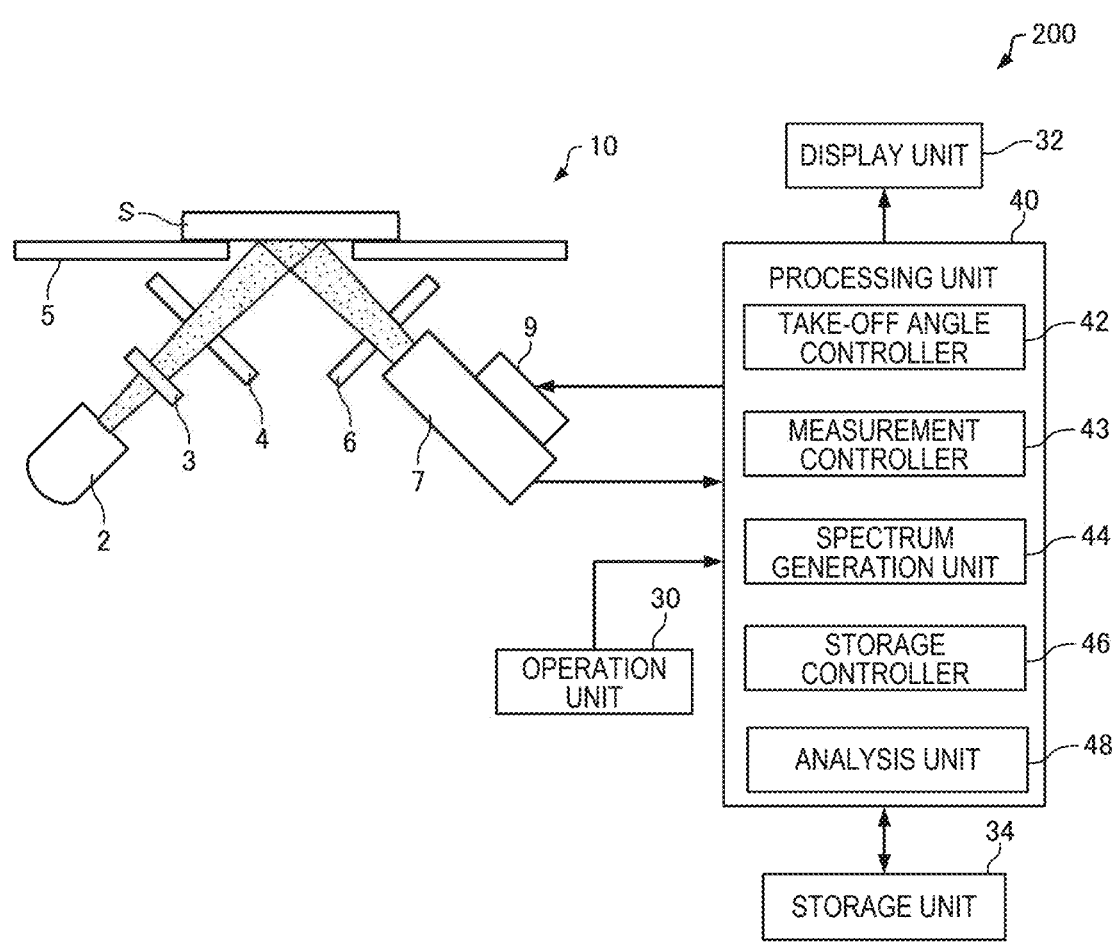
FIG. 14 is a diagram illustrating a configuration of an X-ray fluorescence analyzer according to the second embodiment.

Next, an X-ray fluorescence analyzer according to a second embodiment is described with reference to the drawings. FIG. 14 is a diagram illustrating a configuration of the X-ray fluorescence analyzer 200 according to the second embodiment. Below, the components having similar functions as those of the X-ray fluorescence analyzer 100 according to the first embodiment are given the same reference numerals in the X-ray fluorescence analyzer 200 according to the second embodiment and will not be described in detail again.

The X-ray fluorescence analyzer 100 described above includes a specimen tilting mechanism 8 that makes the take-off angle θ variable as illustrated in FIG. 1.

Instead, the X-ray fluorescence analyzer 200 includes a detector tilting mechanism 9 that makes the take-off angle θ variable as illustrated in FIG. 14.

Figure 15:
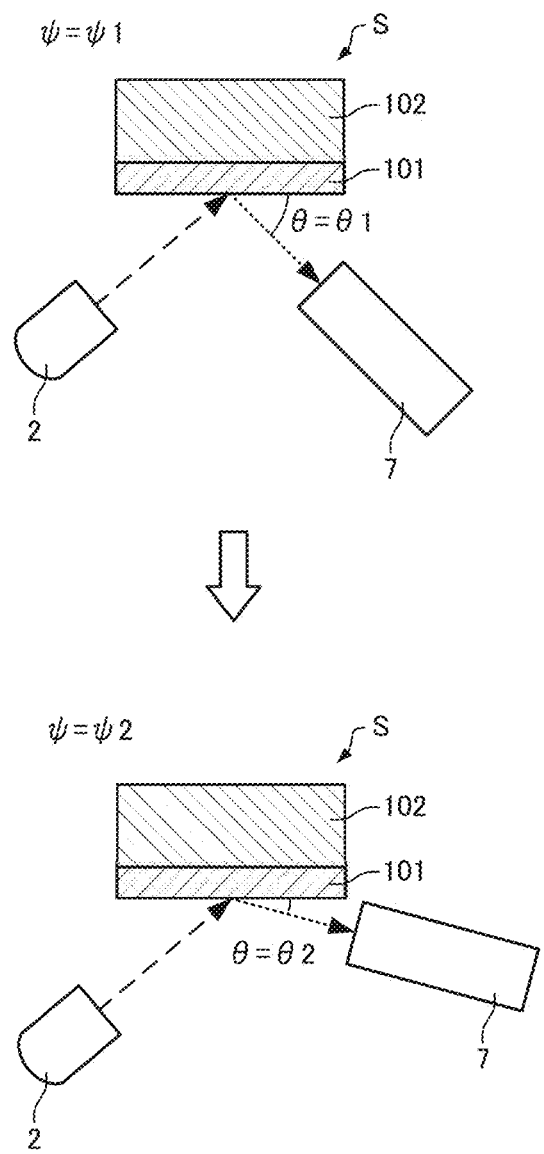
FIG. 15 is a diagram for explaining an operation of a detector tilting mechanism.

FIG. 15 is a diagram for explaining an operation of the detector tilting mechanism 9.

The detector tilting mechanism 9 tilts the detector 7. The detector tilting mechanism 9 can tilt the detector 7 to any desired angle ψ. Tilting the detector 7 can change the take-off angle θ of the secondary X-ray emitted from the specimen S. In the example illustrated in FIG. 15, the detector tilting mechanism 9 changes the inclination angle ψ of the detector 7 from a first inclination angle ψ1 to a second inclination angle ψ2, so that the take-off angle θ of the secondary X-ray is changed from the first take-off angle θ1 to the second take-off angle θ2.

The detector tilting mechanism 9 may tilt the detector 7 by operating a motor, for example, or may tilt the detector 7 by operating a piezoelectric device.

2.2. Analysis Method

In the analysis method using the X-ray fluorescence analyzer 100 described above, the take-off angle θ is changed by tilting the specimen S with the specimen tilting mechanism 8. Instead, in the analysis method using the X-ray fluorescence analyzer 200, the detector 7 is tilted by the detector tilting mechanism 9 to change the take-off angle θ. The analysis method using the X-ray fluorescence analyzer 200 is similar to the analysis method using the X-ray fluorescence analyzer 100 except for this point, and therefore further description is omitted.

2.3. Operation of X-Ray Fluorescence Analyzer

In the X-ray fluorescence analyzer 200, the take-off angle controller 42 changes the take-off angle θ by tilting the detector 7 with the detector tilting mechanism 9. The storage controller 46 stores the inclination angle ψ of the detector 7 in the storage unit 34 as the information for identifying the take-off angle θ. The operation of the X-ray fluorescence analyzer 200 is similar to the operation of the X-ray fluorescence analyzer 100 except for this point, and therefore further description is omitted.

2.4. Advantageous Effects

The X-ray fluorescence analyzer 200 can provide similar advantages effects as those of the X-ray fluorescence analyzer 100.

The embodiments and modification examples described above are merely examples and not limiting. For example, various embodiments and modification examples can be combined as required.

The invention is not limited to the above-described embodiments, and various modifications can be made. For example, the invention includes configurations that are substantially the same as the configurations described in the embodiments. Substantially same configurations means configurations that are the same in function, method, and results, or configurations that are the same in objective and effects, for example. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. An analysis method using an X-ray fluorescence analyzer which acquires an X-ray spectrum by detecting a secondary X-ray emitted from a specimen when the specimen is irradiated with a primary X-ray, the method comprising:
   acquiring a first X-ray spectrum, with a take-off angle of the secondary X-ray being set as a first take-off angle;
   acquiring a second X-ray spectrum, with the take-off angle of the secondary X-ray being set as a second take-off angle that is different from the first take-off angle; and
   obtaining information on an analysis target element in a depth direction of the specimen based on the first X-ray spectrum and the second X-ray spectrum, the specimen including a number of layers, N, wherein (N≥2), and the step of obtaining information on the analysis target element including:
      obtaining a function, FS, which represents a change in X-ray intensity of the analysis target element when the take-off angle is changed;
      creating a model function, FM, which represents a change in X-ray intensity of the analysis target element when the take-off angle is changed, based on estimated concentrations of elements contained in each of the number of layers, N; and
      obtaining a ratio of contents of the analysis target element in the number of layers, N, by comparing function, FS, with the model function, FM.

2. The analysis method according to claim 1, further comprising:
   changing the first take-off angle of the secondary X-ray to the second take-off angle by tilting the specimen.

3. The analysis method according to claim 1, further comprising:
   changing the first take-off angle of the secondary X-ray to the second take-off angle by tilting a detector that detects the secondary X-ray.

4. The analysis method according to claim 1, further comprising:
   acquiring a third X-ray spectrum, with the take-off angle of the secondary X-ray being set as a third take-off angle that is different from the first take-off angle and the second take-off angle, wherein
   in the step of obtaining the information on the element in the depth direction of the specimen, the information on the element in the depth direction of the specimen is obtained based on the first X-ray spectrum, the second X-ray spectrum, and the third X-ray spectrum.

5. The analysis method according to claim 1, wherein
   in the step of obtaining the information on the element in the depth direction of the specimen,
   information on the element in the depth direction of the specimen is obtained based on a ratio of an amount of change in X-ray intensity to an amount of change in the take-off angle of the secondary X-ray.

6. An X-ray fluorescence analyzer comprising:

An X-ray tube that generates a primary X-ray;

A detector that detects a secondary X-ray emitted from a specimen when the specimen is irradiated with the primary X-ray;

A mechanism that makes a take-off angle of the secondary X-ray variable;

A memory; and

A microprocessor configured to:
- Associate an X-ray spectrum acquired by detecting the secondary X-ray by the detector, with information for identifying the take-off angle of the secondary X-ray when the X-ray spectrum has been acquired, and stores the X-ray spectrum associated with the information in the memory;
- Read a first X-ray spectrum acquired with the take-off angle of the secondary X-ray being set as a first take-off angle from the memory;
- Read a second X-ray spectrum acquired with the take-off angle of the secondary X-ray being set as a second take-off angle that is different from the first take-off angle from the memory; and
- Obtain information on an element in a depth direction of the specimen based on the first X-ray spectrum and the second X-ray spectrum, wherein the specimen includes a number of layers, N, wherein N≥2;

Wherein when obtaining the information on the element in the depth direction of the specimen, the microprocessor is further configured to:
- Obtain a function FS, which represents a change in X-ray intensity of the element when the take-off angle is changed, based on estimated concentrations of elements contained in each of the first of the number of layers, N;
- Create a model function, FM, which represents a change in X-ray intensity of the element when the take-off angle is changed, based on estimated concentrations of elements contained in each of the number of layers, N; and
- Obtain a ratio of contents of the element in the number of layers, N, by comparing the function, FS, with the model function FM.

7. The X-ray fluorescence analyzer according to claim 6, wherein the mechanism is a tilting mechanism that tilts the specimen.

8. The X-ray fluorescence analyzer according to claim 6, wherein the mechanism is a tilting mechanism that tilts the detector.

* * * * *

UNITED STATES PATENT AND TRADEMARK OFFICE
CERTIFICATE OF CORRECTION

| | |
|---|---|
| PATENT NO. | : 11,499,927 B2 |
| APPLICATION NO. | : 17/210762 |
| DATED | : November 15, 2022 |
| INVENTOR(S) | : Genki Kinugasa |

It is certified that error appears in the above-identified patent and that said Letters Patent is hereby corrected as shown below:

In the Claims

Column 19, Line 4, Claim 6, delete "An X-ray" and insert -- an X-ray --

Column 19, Line 5, Claim 6, delete "A detector" and insert -- a detector --

Column 19, Line 8, Claim 6, delete "A mechanism" and insert -- a mechanism --

Column 19, Line 10, Claim 6, delete "A memory;" and insert -- a memory; --

Column 19, Line 11, Claim 6, delete "A microprocessor" and insert -- a microprocessor --

Column 19, Line 12, Claim 6, delete "Associate" and insert -- associate --

Column 19, Line 18, Claim 6, delete "Read" and insert -- read --

Column 19, Line 21, Claim 6, delete "Read" and insert -- read --

Column 19, Line 25, Claim 6, delete "Obtain" and insert -- obtain --

Column 20, Line 3, Claim 6, delete "Wherein" and insert -- wherein --

Column 20, Line 6, Claim 6, delete "Obtain" and insert -- obtain --

Column 20, Line 11, Claim 6, delete "Create" and insert -- create --

Column 20, Line 16, Claim 6, delete "Obtain" and insert -- obtain --

Signed and Sealed this
Thirty-first Day of January, 2023

Katherine Kelly Vidal
*Director of the United States Patent and Trademark Office*